(12) United States Patent
Prince et al.

(10) Patent No.: US 6,568,938 B1
(45) Date of Patent: May 27, 2003

(54) DRAWING AID

(75) Inventors: Paul R. Prince, San Juan Capistrano, CA (US); Mary Von Lortz, San Juan Capistrano, CA (US)

(73) Assignee: Gridart, LLC, Reno, NV (US)

( * ) Notice: Subject to any disclaimer, the term of this patent is extended or adjusted under 35 U.S.C. 154(b) by 8 days.

(21) Appl. No.: 09/717,586

(22) Filed: Nov. 21, 2000

Related U.S. Application Data

(60) Provisional application No. 60/168,462, filed on Dec. 2, 1999.

(51) Int. Cl.⁷ .............................................. G09B 11/00
(52) U.S. Cl. ........................................ 434/90; 434/85
(58) Field of Search .............................. 434/81, 84, 85, 434/87, 88, 90

(56) References Cited

U.S. PATENT DOCUMENTS

| | | |
|---|---|---|
| 2,263,101 A | 11/1941 | Perry |
| 3,660,903 A | 5/1972 | Caperton, Jr. |
| 4,001,941 A | 1/1977 | Cruz |
| 4,259,784 A | 4/1981 | MacPherson |
| 4,645,459 A * | 2/1987 | Graf et al. ................. 345/426 |
| 4,689,017 A | 8/1987 | Lehti |
| 4,865,547 A * | 9/1989 | Glover ........................ 434/85 |
| 4,912,850 A | 4/1990 | Gray |
| 5,088,814 A | 2/1992 | Campbell |
| 5,363,561 A | 11/1994 | Essary |
| 5,673,490 A | 10/1997 | Hill |
| 5,749,149 A | 5/1998 | Claytor |

FOREIGN PATENT DOCUMENTS

| | | |
|---|---|---|
| DE | 240 823 A3 | 11/1986 |
| GB | 1 575 303 | 9/1980 |

OTHER PUBLICATIONS

AutoDesk, AutoCad 10 CAD software package, circa 1996.*

Mike Rosak; Oil Painting Assistant,(a software program); copyright 1999–2002; various screenshots of program enclosed.

* cited by examiner

*Primary Examiner*—Jacob K. Ackun
*Assistant Examiner*—Kurt Fernstrom
(74) *Attorney, Agent, or Firm*—Knobbe, Martens, Olson & Bear LLP

(57) ABSTRACT

A system for sketching, illustrating, drawing or painting likeness compositions such as canvas oil paintings from source images includes a set of increasing size reusable overlayable source image grids with image composition frames used with corresponding destination canvas grid patterns, allowing a consistent grid pattern for all canvas sizes by using predetermined grid dimensions for each canvas size. The image grid patterns may be affixed to clear plastic sheets or may be software-generated patterns. This combination greatly simplifies the use of grids in artwork and provides low-cost timesaving methods to draw accurate perspective. The system includes a unique canvas grid ruler for simplifying generation of canvas grid lines and in some embodiments canvases are pre-printed or backside-shadowed with appropriate canvas grid patterns and labels.

16 Claims, 12 Drawing Sheets

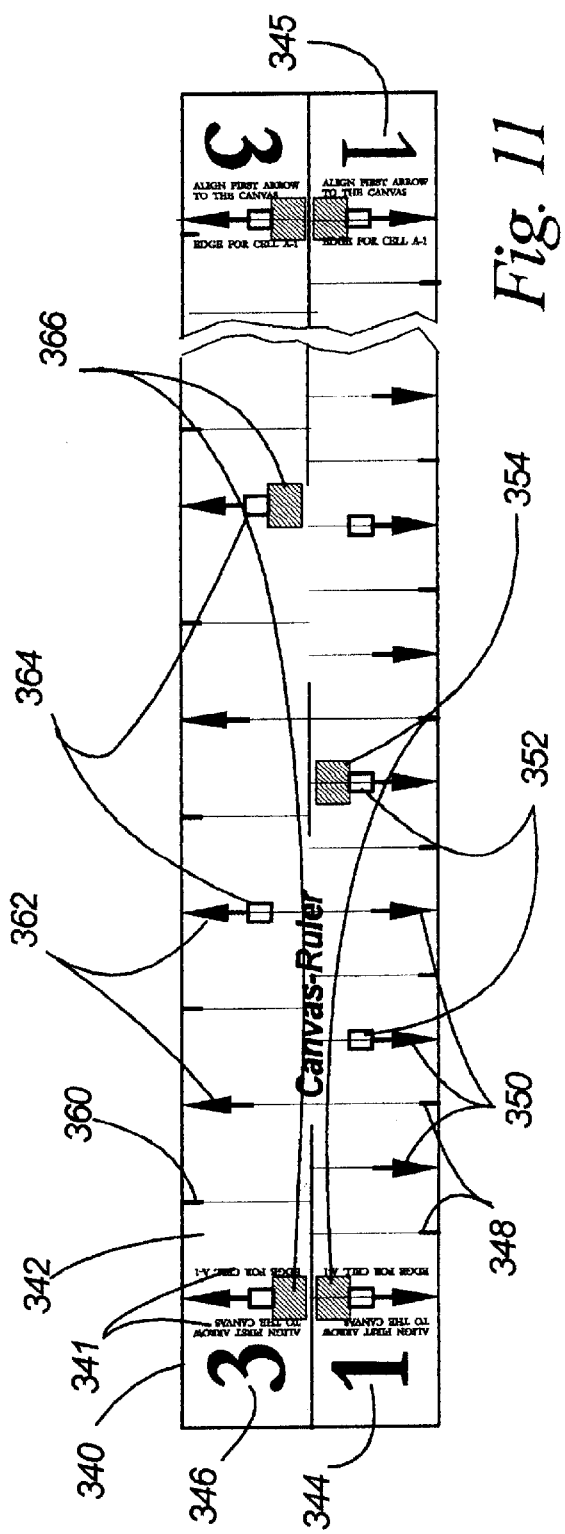
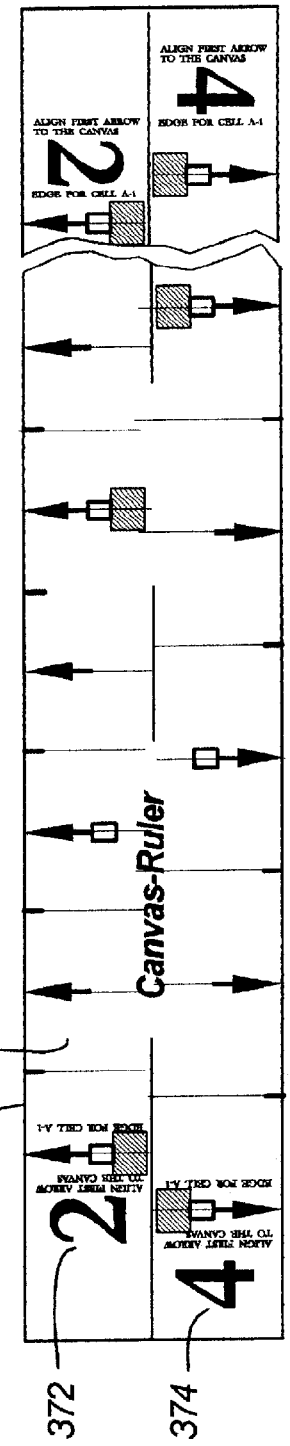
Fig. 11
Fig. 12

Fig. 19

| Canvas Dimensions | | | | GridArt™ Ruler Information for Marking Grid Lines | | | GRID SIZE |
|---|---|---|---|---|---|---|---|
| COLUMN 1 (No Corner-Guide Req'd) | COLUMN 2 (Square Canvas) | COLUMN 3 (2:1 Canvas Shape) | COLUMN 4 (Canvas Shapes with Partial Cells) | Ruler Scale | Marker Description | Ruler Grid Markers | |
| 4 X 5 | 4 X 4 | 2 X 4 | 4 X 6 | A | USE EVERY LINE & ARROW | | 1/2 |
| 5 X 6-1/4 | 5 X 5 | 2-1/2 X 5 | 5 X 7 | B | | | 5/8 |
| 6 X 7-1/2 | 6 X 6 | 3 X 6 | 6 X 8 | C | | | 3/4 |
| 7 X 8-3/4 | 7 X 7 | 3-1/2 X 7 | | D | | BLACK | 7/8 |
| 8 X 10 | 8 X 8 | 4 X 8 | 6 X 9; 7 X 9 | A | USE EVERY ARROW THAT HAS | | 1 |
| 10 X 12-1/2 | 10 X 10 | 5 X 10 | 8-1/2 X 11; 9 X 12 | B | | | 1 1/4 |
| 12 X 15 | 12 X 12 | 6 X 12 | 10 X 14; 11 X 14 | C | | | 1 1/2 |
| 14 X 17-1/2 | 14 X 14 | 7 X 14 | 12 X 16; 11 X 17 | D | | BLACK | 1 3/4 |
| 16 X 20 | 16x16; 16x16 | 8 X 16 | 14 X 18; 16 X 18 | A | USE EVERY ARROW THAT HAS | | 2 |
| 20 X 25 | 18x18; 20x20 | 10 X 20 | 18 X 24; 20 X 24 | B | | | 2 1/2 |
| 24 X 30 | 24 X 24 | 12 X 24 | 22 X 28 | C | | | 3 |
| 28 X 35 | 28 X 28 | 14 X 28 | 20 X 32 | D | | RED | 3 1/2 |
| 32 X 40 | 32 X 32 | 16 X 32 | 24x36; 30x36; 30x40 | A | USE EVERY ARROW THAT HAS | | 4 |
| 40 X 50 | 40 X 40 | 20 X 40 | 36x40; 36x48; 40x48 | B | | | 5 |
| 48 X 60 | 48 X 48 | 24 X 48 | 36 X 60; 40 X 60 | C | | | 6 |
| 56 X 70 | 56 X 56 | 28 X 56 | 56 X 64 | D | | BLUE | 7 |
| 64 X 80 | 64 X 64 | 32 X 64 | 48 X 72; 60 X 72 | A | USE EVERY OTHER ARROW THAT HAS | | 8 |
| 80 X 100 | 80 X 80 | 40 X 80 | 60 X 84; 72 X 96 | B | | BLUE | 10 |

Table includes standard and custom canvas sizes. All dimensions shown are in inches for use with the GridArt™ Ruler. If your canvas size is not shown above, substituting feet for inches, a 12 foot X 15 foot wall uses 1 1/2 foot grid lines (see last column). In this way, you may even paint murals, billboards, etc. from our website GridArt.com.

A general method to find your grid size for any size drawing surface, and using any unit of measure is:
Divide the drawing surface LONG dimension by 10 (since there are 10 Image-Guide columns). } Choose the largest of these numbers,
Divide the drawing surface SHORT dimension by 8 (since there are 8 Image-Guide rows).         and round UP to a convenient grid size.

DRAWING AID

PRIORITY CLAIM

This application claims the benefit of U.S. Provisional Application No. 60/168,462 presently bearing a filing date of Dec. 2, 1999 but believed entitled to a date of Nov. 26, 1999 when mailed by certified mail.

FIELD OF THE INVENTION

This invention relates to methods and apparatus useable in the fields of art and graphics. In particular the preferred embodiment of this invention accurately creates a likeness of a source image such as a photograph onto a destination base such as a painting on canvas.

BACKGROUND

Over the past centuries mankind has performed drawing and painting for expression of experiences, communication, documentation, and cultural art. In many cases it has been desirable to generate works of art with accurate shapes and accurate perspective representations. The use of gridding or "squaring" has become commonplace for beginning art students as well as many professional artists for creating a likeness with accurate perspective and shape. In its linear form, gridding involves subdividing a source image into a number of squares that are individually relatable to destination squares usually of a different size drawn upon the destination base such as a canvas, well known in the field of art. In the initial steps of creating a drawing or painting the general outlines of the image in each square are translated into each corresponding destination base square, sometimes including shading details. Any square within finer detail regions may be subdivided into smaller squares, for example four, in order to facilitate accurate detail portrayal onto the destination base or canvas. The final work of coloring the drawing is then performed, typically without further need of grids in that phase.

Prior art includes a manual process of inking or penciling a grid pattern of equally spaced parallel lines and a pattern of normals, typically forming squares, onto the source image, and calculating and inscribing a corresponding grid pattern upon the destination base or canvas. Drawing a representation of the source image from each cell of the source grid pattern into each corresponding destination base cell allows accurate relative positioning of the contents within the image cell-by-cell, leading to accurate perspective, shape, and three-dimensional representations.

Art and drawing texts, for example, Smith et al, An Introduction to Art Techniques, 1995 describe the process of manual gridding which involves time-consuming measuring and scaling of the original source such as a photograph, and carefully drawing horizontal and vertical grid lines, dividing the desired image area into an array of square cells. The artist then calculates and marks all four edges of the destination base or canvas and later constructs interconnecting graduation lines to form intersecting row and column lines that form a grid pattern of cells to correspond, one-to-one, with the grid previously drawn onto the source image. Typically the destination canvas is larger than the source, but may be of similar or smaller size. The rows and columns are labeled on image grids and canvas grids numerically or alphabetically or both.

The aspect ratio height/width for rectangular canvas shapes must be similar for source and destination in order to provide a full and complete linear representation onto the destination base with respect to the source. Artists are taught to individually measure and draw these grid patterns, which is a laborious, tedious, and time-consuming process that can involve mistakes and require erasures. Oftentimes an artist grids an image, then grids the canvas only to find that his/her desired composition is not correctly covered with the grid pattern, and must erase labels and/or grid lines and construct them again.

Artists are faced with confusing geometric calculations involving image size and shape, canvas size and shape and magnification, particularly in view of the wide variety of canvas sizes and shapes or aspect ratios. Many drawing textbooks suggest enlarging a source picture on a copy machine prior to gridding. All of these variables often cause artists to compromise their composition area and position due to the complexities of gridding and preparing for drawing.

No prior art known to the inventors simplifies the process of composing and drawing a likeness of an image by framing and adjusting the composition on the source while also reducing the complexity of the gridding process of the source and the destination base or canvas in accordance with the present invention.

SUMMARY OF THE INVENTION

The preferred embodiments of the present invention provide systems, guides and methods for greatly facilitating the process of gridding a photograph or other image to be painted or drawn. In particular, the system enables art students of all ages to select (a) the precise format to fit on the canvas to be drawn or painted, (b) the precise portion of the image desired to be painted or drawn, and (c) the precise overall composition of the final painting or drawing.

A significant feature of the preferred embodiment of the invention provides a series of graduated grid patterns with the artist selecting the grid pattern corresponding to the size of the canvas to be painted or drawn. For increased gridding detail, the invention provides overlay patterns having a reduced grid size.

Certain of the preferred embodiments of the invention include a series of image-guides, including large image-guides and detail image-guides, a corner-guide, a set of canvas tables, a ruler with a set of scales for marking canvas grids, and in some embodiments, pre-gridded canvases or back-shadowing transparencies for placing behind canvases and illuminating from the back.

Other preferred embodiments of the invention include computer generated graduated image-guides combined with a source image and displayed or printed for artists to use for creating a likeness of the image onto a destination base or canvas.

The series of graduated image-guides are preferably rectangular arrays of rectangular grid cells that are typically identical squares and advantageously pre-printed on clear plastic film or other clear material. The grid patterns consist of, for example, 8 rows by 10 columns forming 80 cells. A bold rectangle outlining the grid array will be called a composition frame and actually represents what could be a frame around the final drawing or painting, but sized at the source image scale. That is, the composition frame of the image-guide substantially represents the frame of the canvas reflected onto the source image. This composition frame allows the artist to easily visualize the final composition on the image that will be drawn onto the canvas without concentrating on the canvas, image grid lines, canvas grid lines, magnifications, and the like. To facilitate this understanding, the image-guide composition frame may appear as a picture frame with representations of wooden molding strips mitered at the corners and/or matte materials or the like.

A significant feature of this invention is that the image to be painted or drawn is configured with a grid pattern identical to the grid pattern drawn or otherwise applied to the canvas, i.e., the invention provides identical grid patterns and number of cells for both the canvas and the image and thereby greatly facilitates the gridding process. Thus, for example, for a predetermined grid array such as 8 rows by 10 columns—there is no requirement for the user to calculate magnification ratios, analyze candidate grid sizes, and the like. Eight by ten cells in an image-guide relates to eight by ten cells on any size 0.80 aspect ratio canvas, so that each has the same number, eighty cells total. The larger the canvas, the larger the canvas grid dimensions, always resulting in eighty canvas cells. Likewise, the larger or smaller an image, the larger or smaller are its grids and composition frame of the 80 cells of the image-guide. In this way, the eight by ten pattern can be used for any canvas of that aspect ratio, and by choosing an image-guide with its frame of the appropriate size; substantially any practical image size of that aspect ratio may be utilized as well.

For most common canvas sizes it has been found that the dimensions are divisible by a series of only a few canvas grid ruler scales. Substantially all may be generated with multiples of ½ inch, ⅝ inch, ¾ inch, and ⅞ inch so that a simple-to-use canvas ruler can be constructed.

The 0.80 aspect ratio image-guides are useable with other canvas shapes. A corner-guide consisting of two intersecting heavy lines or depictions of picture frame molding, for example, may be used for masking while continuing to create what represents a frame, used for framing the source image when the aspect ratio is not 0.80. The corner-guide is placed at the intersection of the row and column, or fractions thereof, appropriate for a specified canvas aspect ratio.

The series of image-guides of grid size 0.20 through 1.00 inch may include, for example, eight overlay sheets increasing in 26% linear dimension steps. In this way, an artist may compose an image with flexibility for increasing or decreasing its size in 26% steps in order to frame a desired region. For more flexibility, fifteen uniform 12% steps may be provided, or twenty-nine uniform 6% steps, for example.

Since all 0.80 aspect ratio canvas sizes require 8 rows and 10 columns, each such canvas size requires a unique grid pattern. Thus a 16 by 20 inch canvas will require a 2.00 inch grid spacing, and can be manufactured with that pattern and with labels, a further advantage and facet of the present invention. Likewise, for use with the above-described image-guides, a 24 by 30 inch canvas will uniquely require 3.00 inch grid spacing and may be pre-printed. Additionally, other aspect ratio canvas shapes will require unique grid patterns when used with the 8 by 10 shape image-guides. For example a 15 by 20 inch canvas requires 2.0 inch grid spacing and can be pre-printed with 7 ½ rows by 10 columns for its 0.75 aspect ratio.

BRIEF DESCRIPTION OF THE DRAWINGS

In order to more fully understand the manner in which the above-recited and other advantages of the invention are obtained a more particular description of the invention will be rendered by reference to specific embodiments thereof which are illustrated in the appended drawings. Understanding that these drawings depict embodiments of preferred embodiments of the invention and are therefore not to be considered limiting of its scope, the invention in its presently understood best modes for making and using the same will be described with additional specificity and detail through the use of the accompanying drawings in which:

FIG. 11 illustrates one embodiment of the first side of a ruler for making grid lines on the canvas showing scales 1 and 3.

FIG. 12 illustrates the second side of the ruler of FIG. 11 showing scales 2 and 4.

FIG. 19 illustrates a preferred embodiment of the Canvas Table for determining canvas ruler scale and markings, and grid sizes for any canvas size.

DETAILED DESCRIPTION OF THE INVENTION

For purposes of this patent, the term "canvas" shall include the destination base for drawings and paintings, typically made of canvas over a wooden rectangular structure. Destination bases such as paper, felt, fabrics, T-shirts, and the like shall also be included in this meaning. Canvas may also refer to a stucco wall, interior wall, and any other material or structure onto which an artist or drawer applies his or her work. The term "likeness" denotes the artist's work as derived from an original, including a copy, duplication, or replication, and in the context of this patent, likeness and replication shall both include drawings made at different magnifications or sizes than the original.

Figure 1:
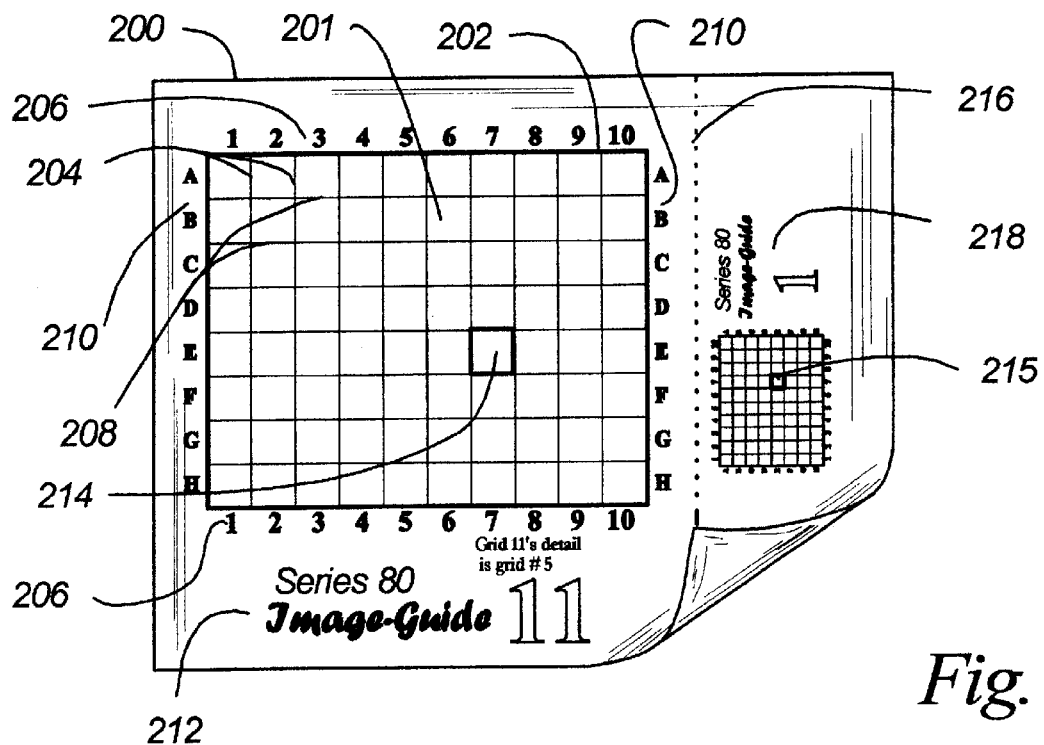
FIG. 1 depicts an acetate sheet with two series 80 image-guides of the present invention.

FIG. 1 depicts a preferred embodiment of an image-guide. Sheet 200 is advantageously clear plastic on which are printed one or more image-guides from a series. In the embodiment shown, image-guide 11 212 and image-guide 1 218 are printed on the same sheet and later separated by the user by cutting along cut-path 216. Each image-guide contains 8 rows and 10 columns. Image-guides are identified with a sheet number from a series, such as sheet number 11 in image-guide-11 212 which includes vertical grid lines 204 and column labels 206 along with horizontal grid lines 208 and row labels 210. Image-guide-11 composition frame 202 boldly outlines the eighty square cells formed, including cell E7 214 at the intersection of the 7th column and row "E". Image-guide-11 212 cell E7 214 may be 0.630 inch along each side whereas image-guide-1 218 cell E7 215, may be 0.198 inch along each side.

It has been found that 80 cells is a convenient density of cells for many artists. However, other patterns, such as 12 rows by 15 columns can be provided for artists favoring higher densities, and lower densities such as 4 rows by 5 columns can be provided for artists favoring lower density grid patterns and for some children. Additionally, other aspect ratios could be used in place of the 0.80 aspect ratio all within the scope of the present invention.

Thus with only a few image-guides, such as approximately eight to twenty-nine, substantially all practical images and all canvases of a particular aspect ratio, such as height/width=0.80 can be accommodated.

The set of 8 row by 10 column image-guides may be termed series 80, and may include image grid sizes from 0.20 inch squares to 1.00 inch squares, for example, resulting in image-guide composition frames ranging from 1.6 inches by 2.0 inches to 8.0 inches by 10.0 inches.

Sheet 200 is advantageously forward from a polycarbonate or an acetate preferably 8 ½ inches by 11 inches and approximately 0.004 inch thick as is commonly used for producing transparencies using laser copiers and printers, and is readily available at low cost due to high volume production. Such sheets are available from Apollo Co., 60 Trade Zone Court, Ronkonkoma, N.Y. 11779 and provided in package PP 100C.

To manufacture image guides, the lines and features may be imprinted using a laser printer. To discourage illegal copying of image-guides onto acetate sheets, substantially non-copyable image-guides may be produced using white ink or paint in a silkscreen process, or white toner material made with titanium dioxide, for example, and available from KLE, P.O. Box 2452, Jupiter, Fla. 33468; Tel: (561)743-0636 and also reachable on the internet at ColorToner.com on the internet. Laser printing may be accomplished using a Lexmark printer model number 4039 10 Plus, available through KLE noted above. Printing may be provided on either the front or the back surface to optimize durability in view of the use of tape, described below, which may tend to lift the printing if used carelessly.

Figure 2:
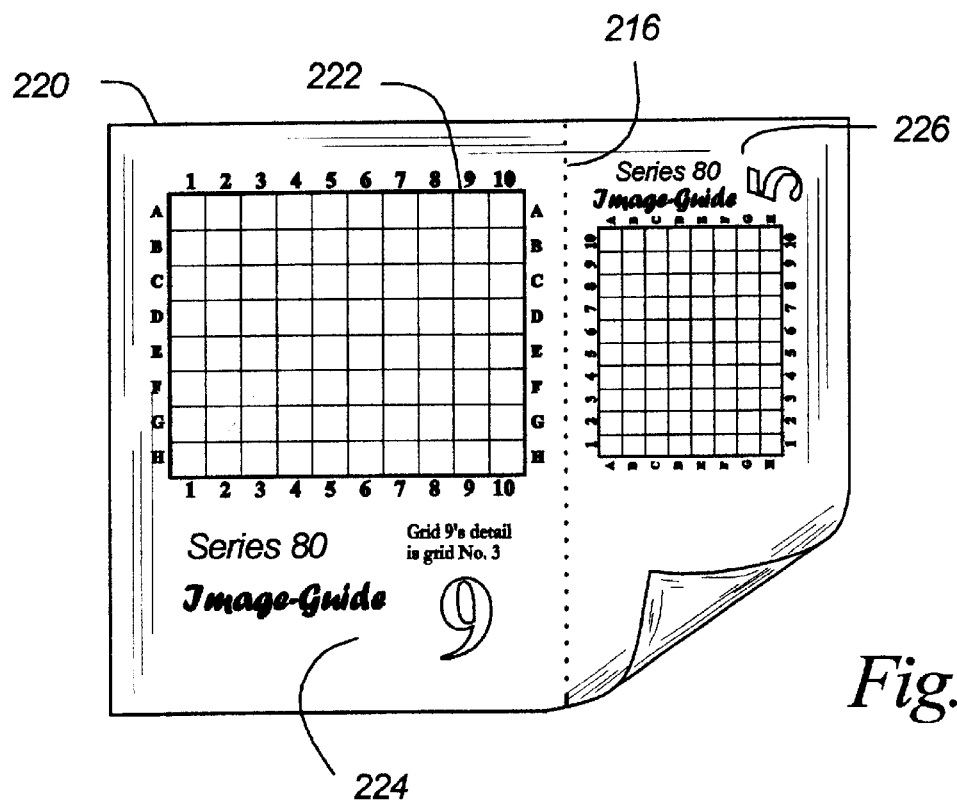
FIG. 2 depicts another acetate sheet with two additional series 80 image-guides of the present invention.

FIG. 2 depicts a companion image-guide sheet 220 with image-guide-9 224 and image-guide-5 226 separable by cutting along cut-path 216. Image-guide-9 224 composition frame 222 outlines the eighty cells of the 8 rows by 10 columns.

The image-guides of FIG. 1 and FIG. 2 are advantageously members of a set of image-guides with grids and composition frames increasing in size from one image-guide to the next. In one preferred embodiment, the set includes 18 image guides with a step of 12.25% from one image-guide to the next in the set and shown tabulated in TABLE I below.

As described below, it is desirable to provide detail image-guides for each of the large image-guides so that large cells may be divided into four, for example, detail cells using one of the smaller image-guides in the series. It is also desirable to include 0.250 inch, 0.500 inch, and 1.00 inch in the series and for the series to

TABLE I

Eighty-cell Image-guide Grid and Composition frame dimensions.

| Image Guide Sheet No. | Cell Side, Inch | Composition Frame Height inches | Composition Frame Width inches | Useable also as a detail image-guide for Sheet No.: |
|---|---|---|---|---|
| 1 | 0.198 | 1.59 | 1.98 | 7 (13)* |
| 2 | 0.223 | 1.78 | 2.23 | 8 (14)* |
| 3 | 0.250 | 2.00 | 2.50 | 9 (15)* |
| 4 | 0.281 | 2.24 | 2.81 | 10 |
| 5 | 0.315 | 2.52 | 3.15 | 11 |
| 6 | 0.354 | 2.83 | 3.54 | 12 |
| 7 | 0.397 | 3.17 | 3.97 | 13 |
| 8 | 0.445 | 3.56 | 4.45 | 14 |
| 9 | 0.500 | 4.00 | 5.00 | 15 |
| 10 | 0.561 | 4.49 | 5.61 | |
| 11 | 0.630 | 5.04 | 6.30 | |
| 12 | 0.707 | 5.66 | 7.07 | |
| 13 | 0.794 | 6.35 | 7.94 | |
| 14 | 0.891 | 7.13 | 8.91 | |
| 15 | 1.000 | 8.00 | 10.00 | |

*Detail image-guides shown for 2:1 and those indicated ( )* for 4:1 span a grid range of approximately 0.20 inch to 1.0 inch as found by practical experience of artists and students. Defining:

p=increase in edge dimension per image-guide step, percent;

n=number of image-guide sizes from any detail image-guide and its corresponding large image-guide d=number of linear subdivisions a detail image-guide divides its corresponding large image-guide into; then the size step, p, is found from:

$$p=100(n^d-1) \% \quad [1]$$

For example, for d=2 and only one step from a 0.250 grid size to a 0.500 grid size, solving equation [1] for n=1 leads to p=100%. This indicates that if the 0.25 inch grid dimension is increased by 100% to 0.50 inch, there would be no intermediate image-guides between the 0.25 and 0.50 inch image-guides if n=1.

For n=3, p=26%, and for n=6, p=12.25%, with 2 intermediate and 5 intermediate image-guides respectively between and including 0.25 and 0.50 inch grid spacings, and 8 and 15 image-guides respectively between and including 0.2 and 1.0 inch grid spacings. For n=12, p=5.95%, 29 image-guides between and including 0.2 and 1.0 inch grid spacings result, providing an artist with great flexibility in magnification when composing a composition over an image with the choice of 29 composition frame sizes. Other values of d may be provided for detail guides, such as 3, in which case each image-guide cell or square would be divided into 3 horizontally by 3 vertically for nine detail cells or subsquares. The preferred embodiment utilizes d=2 for subdividing each image-guide cell into four detail cells, and for certain cases shown in Table I with ( )*, a subdivision of 4 by 4 results.

Table I provides the grid side cell dimension, composition frame height, and composition frame width of all 15 image-guides in the series 80 set with n=6. Odd numbered image-guides of Table I represent the 8 image-guides spanning the range of 0.20 inch to 1.0 inch with n=3, and for the set of n=12 there may be an intermediate image-guide, not shown, between each of those shown in the table. It has been found that the n=3 set with 26% size increments between image-guides is useful for beginning artists, and that for increased ability to compose an image, n=6 with 12% size increments between image-guides is useful, in which case all 15 sheets of Table I would be provided. Professional artists interested in fine magnification steps for exceptional flexibility may choose a set of 29 image-guides, or a larger set, for example.

The image size range, which is the range in size of the composition frames, of the image-guides in Table I covers 1.6 by 2.0 inches to 8.0 by 10.0 inches. This range could be extended if desired by providing smaller and/or larger image-guides in the series.

Figure 3:
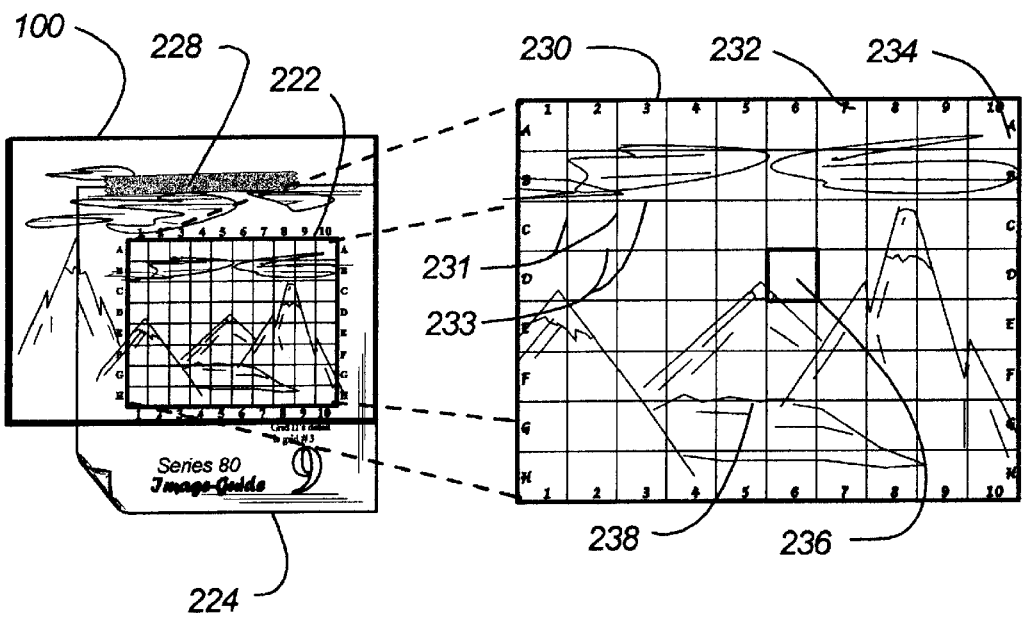
FIG. 3 illustrates the use of a size 9 image-guide of the invention.

FIG. 3 illustrates the use of a detail image-guide to grid only a portion of a picture 100 and thus magnify a selected portion of the picture 200 to be painted or drawn on the canvas 230. Image-guide-9 224 is placed on picture 100 to enclose an image area with composition frame 222, which is replicated onto the canvas 230 which has been gridded in the manner described below with vertical grid lines 231 and column labels 232, and with horizontal grid lines 233 and row labels 234.

Figure 4:
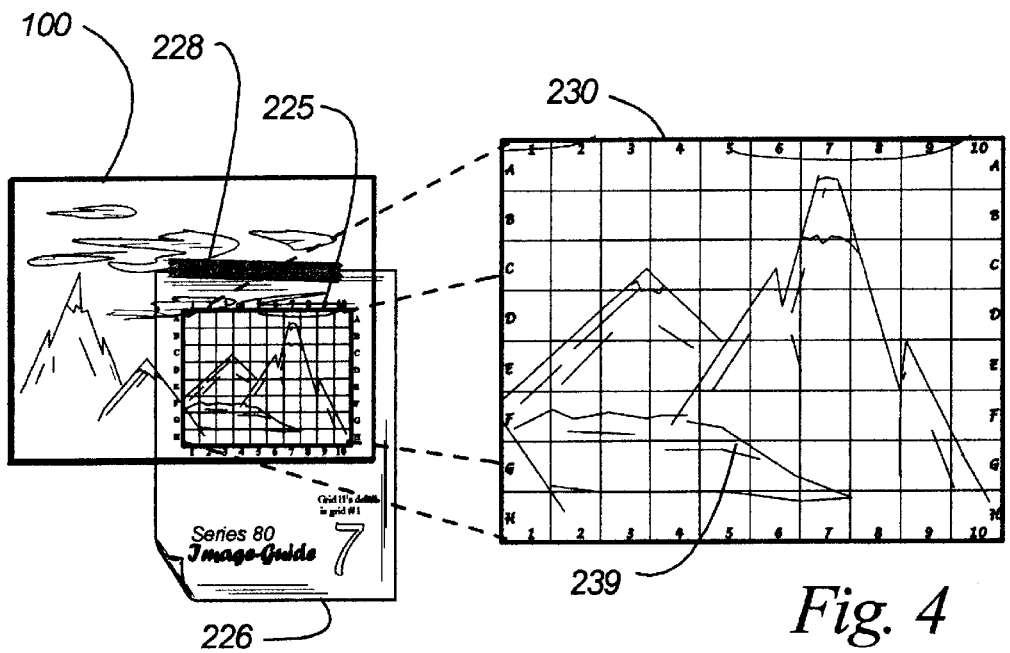
FIG. 4 illustrates the use of a size 7 image-guide of the invention.

FIGS. 3 and 4 taken together illustrate the adjustment in composition area achieved by using a smaller image-guide-7 226 in FIG. 4 in place of image-guide-9 224 of FIG. 3. In these two figures picture 100 size is the same, such as 8 by 10 inches, and canvas 230 size is the same, such as 16 by 20 inches. The area covered by image-guide-9 224 is enclosed by composition frame 222, and a smaller area covered by image-guide-7 226 is enclosed by composition frame 225. Since image-guide-7 226 covers a smaller image area on picture 100 than does image-guide-9 224, and the image area in each case is magnified to cover the full canvas 230, the magnification of image-guide-7 226 is greater than that of image-guide-9 224, and the composition 239 in FIG. 4 is of a smaller region of the scene than the composition 238 in FIG. 3. It is thus seen that small adjustments in composition can be accomplished through selection of image-guides used, and the actual composition can be viewed within the image-guide composition frame upon the image without paying attention to the canvas. The side dimension of grid 236 may be calculated from the canvas 230 width by the number of columns, 10. Therefore canvas grid 236 measures 20 inches/10 =2.0 inches on a side. However, it is not necessary for an artist to calculate or know the canvas grid size since the canvas gridding scale is provided in a table, as described below. Image magnification may be determined by canvas grid size/image grid size. From Table I image-guide-9 grid size is 0.50 inch, so the magnification is 2.0 inches/0.50 inch=4.0. However, an artist is not required to calculate or know the value of magnification. The magnification of image-guide-7 226 to canvas 230 in FIG. 4 is 2.0 inches/0.397 =5.0.

After choosing the general composition area by selecting an image-guide, an artist translates the image-guide horizontally and vertically over picture 100 to adjust the composition that will appear on the canvas. The composition frame of the image-guide serves as a representation of the canvas edges over the picture, which allows the artist to better optimize the composition and do it very quickly. Once the composition is defined, the artist may secure the image-guide to the picture using tape 228, such as masking tape commonly used in drafting.

The foregoing discussion has related to compositions in the landscape orientation in which the horizontal dimension is larger than the vertical dimension. The portrait orientation involves images in which the vertical dimension is larger than the horizontal dimension. All that is required to replicate an image in the portrait orientation is a 90-degree counter-clockwise rotation of the image-guide, and a corresponding positioning of the canvas. In this way, cell A-1 is located in the lower left corner rather than the upper left corner. The remainder of this description will describe images and compositions in the landscape orientation, it being clear that these features and improvements apply equally to images and compositions in the portrait orientation.

Figure 5:
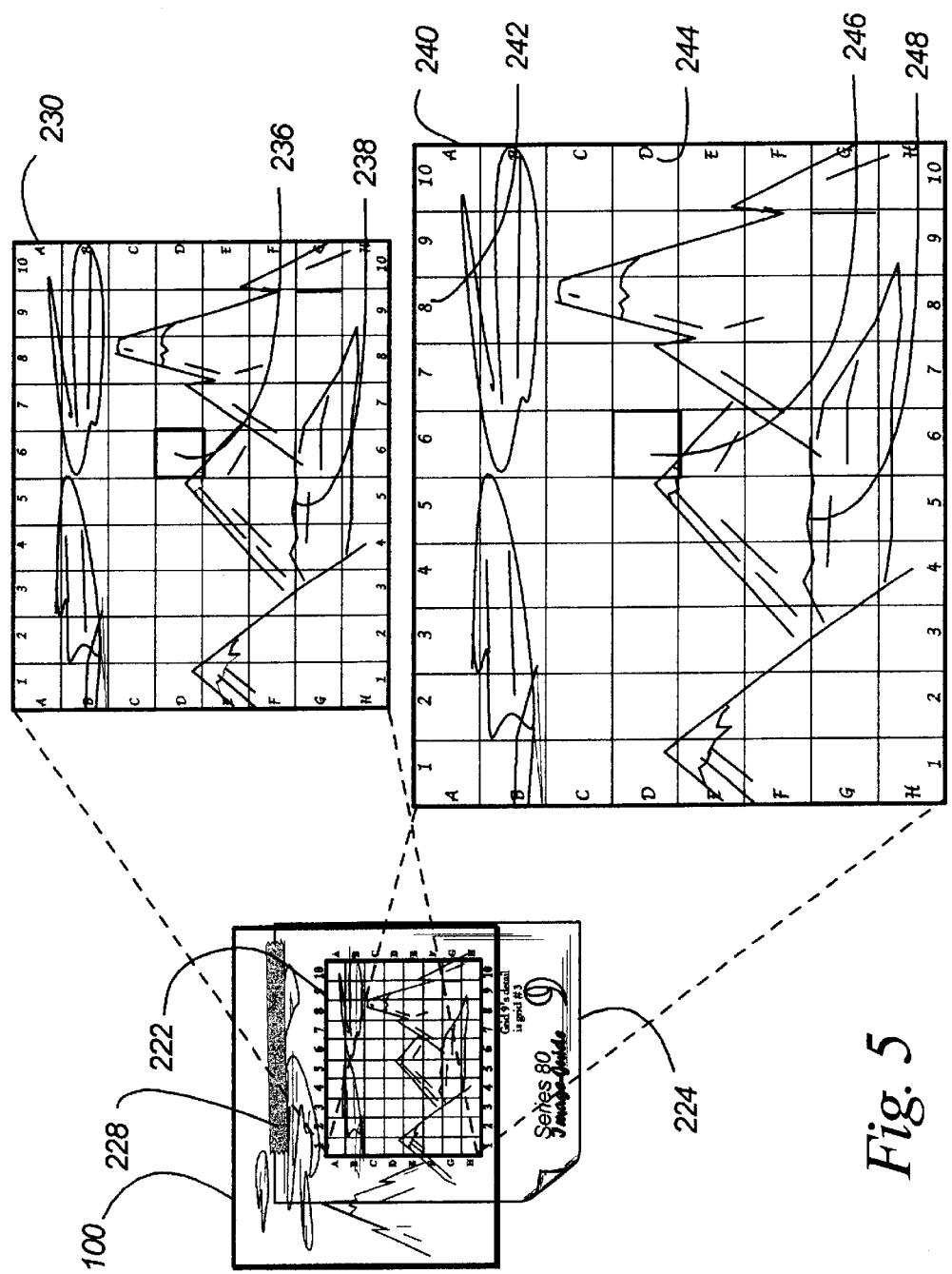
FIG. 5 illustrates the use of a size 9 image-guide in the drawing of a likeness of an image onto two canvas sizes.

FIG. 5 compares the use of image-guide-9 224 secured to image 100 with tape 228 and used for two canvas sizes to illustrate that the image composition is independent of canvas size when using the system of the present invention. In this way the artist can focus concentration with respect to her composition strictly on the picture and the image-guide composition frame. The upper canvas 230 is similar to that of FIG. 3 and may be 16 by 20 inches, whereas the lower canvas 240 may be 24 by 30 inches, for example. It was previously found that cell 236 measured 2.0 inches on a side and that the magnification ratio was 4.0 from image-guide-9 224. For the lower canvas 240, the grid dimension is found from the canvas width/10, and is 3.0 inches. The magnification from the image to the lower canvas 240 is therefore 3.0/0.50=6.0. Using the system of this invention, an artist will, however, not be concerned with magnification ratios or with grid dimensions of either image or canvas. She simply chooses the canvas, frames the image with the image-guide to her liking, tapes the image-guide in place on the picture, and proceeds to grid the canvas according to a color-coded ruler to be described.

Figure 6:
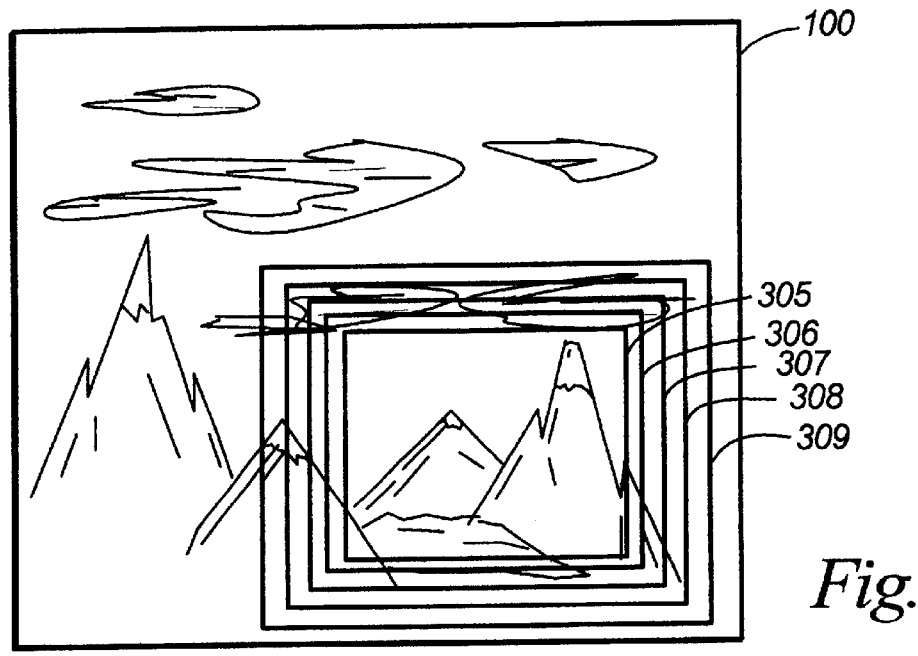
FIG. 6 depicts several frames of image-guides superimposed over an image to illustrate the magnification adjustment of the invention.

It is evident from these figures and discussion that for Series 80, the canvas grid size is not related to the image-size or the specific image-guide in use, but is related only to the canvas dimensions. Therefore canvases of this invention may be pre-printed with grids and labels and will be useable with all image-guides of Table I, and any picture within the image size range of the image-guides will then be useable with any canvas. Therefore canvas 230 may be imprinted using a silk-screening process for placing grid lines and labels thereon, a process well known in the art. Silk-screening is a stencil method of printing on a flat surface through a piece of silk or other fine cloth on which all parts of the design not to be printed have been stopped out by an impermeable substance. FIG. 6 further illustrates the simplified adjustment in composition image area within picture 100 wherein five composition frames are depicted from five image-guides of Table I. Frame 305 represents the outline of the grid pattern of image-guide 5. The remaining frames 306, 307, 308, and 309 represent the composition frames of image-guides 6, 7, 8, and 9 respectively.

Figures 7, 8:
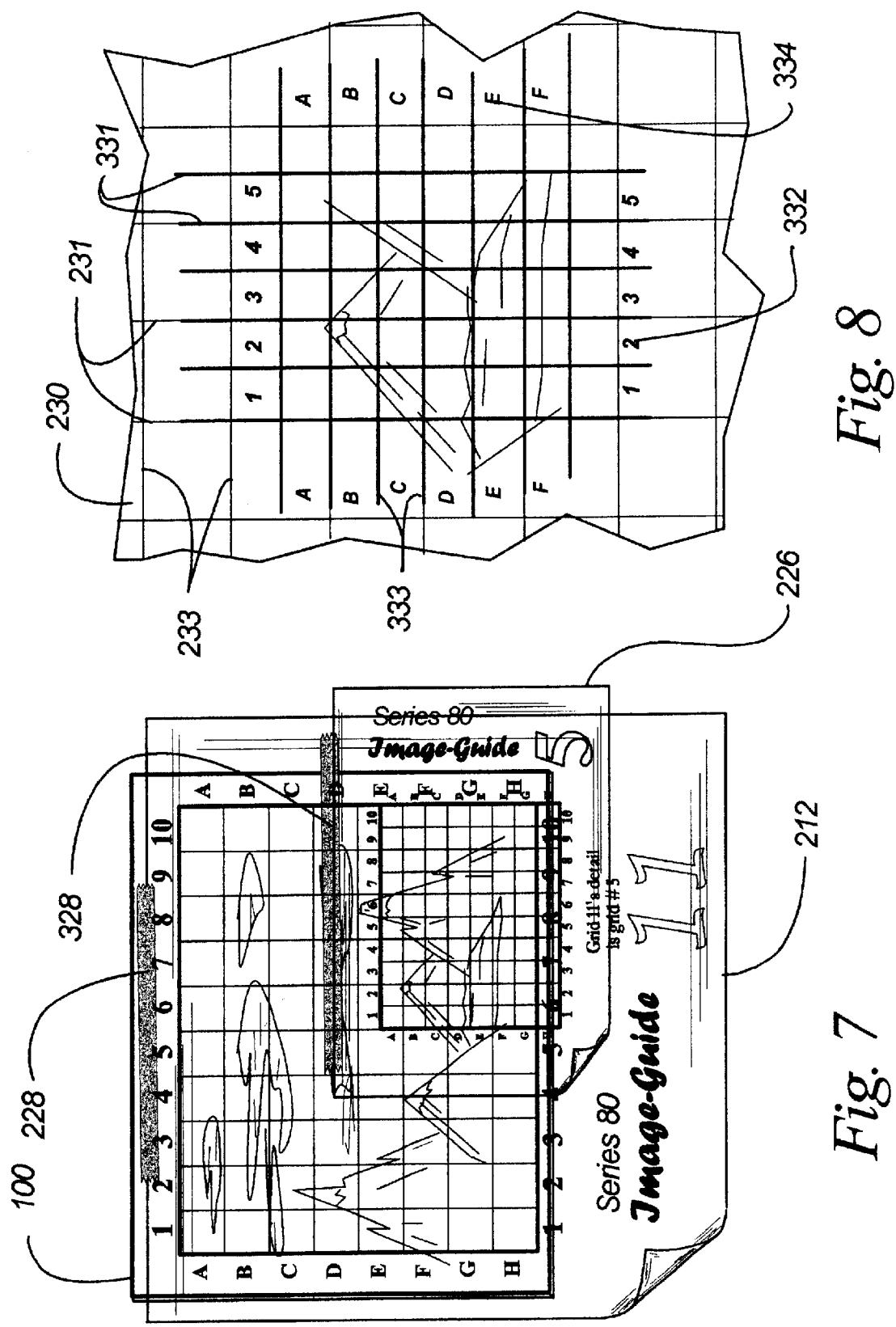
FIG. 7 depicts the use of a size 11 image-guide with a size 5 detail image-guide for creating a likeness of fine detail within the image.
FIG. 8 illustrates a region of a canvas in which detail from the image of FIG. 7 is drawn, showing canvas grid lines and canvas detail grid lines.

A significant feature of the invention is that the larger image guide sheets are readily combined with another mark detailed image guide sheet whenever the artist desires to use additional grid lines for a portion of the photograph 100 or other original being used by the artist to create a likeness on a canvas. FIG. 7 depicts picture 100 overlaid with image-guide 11 212 secured with tape 228, and further overlaid with a second image-guide 5 226 secured with tape 328 over a region for which the artist desires a smaller grid spacing for fine detail.

When a more detailed image grid is overlaid an image-guide as shown in FIG. 7, the artist will advantageously also grid a portion of the canvas with a smaller grid spacing corresponding to the more detailed image guide. Depicted in FIG. 8 is a portion of a canvas 230 with vertical canvas grid lines 231 and horizontal canvas grid lines 233, previously discussed, upon which detail vertical canvas grid lines 331 and detail horizontal canvas grid lines 333 are constructed. Detail row and column canvas labels 334 and 332 respectively may be drawn onto the canvas. Other preferred embodiments, not shown, employ detail row labels J through Q and detail column labels 11 through 20 for clarifying cell identifications, on both detail image-guides and on canvas detail regions.

It will further be seen that substantially all canvases are useable with the image-guides of Table I, even if their aspect ratios are not 0.80. For canvas shapes other than 0.80 aspect ratio, the set of 8 row by 10 column image-guides are useable by simply masking or ignoring certain rows, columns, or fractions thereof, or by extending slightly beyond the 8 rows by 10 columns to frame the desired image area for composing the drawing shape to match the canvas shape. For example, 0.50 aspect ratio canvases may be framed with the 4 row by 8 column sub-array of the 8 row by 10 column image-guides, or with the 5 row by 10 column sub-array. Additionally, square canvases may be framed using the 8 row by 8 column sub-array or the 7 row by 7 column sub-array, for example, of the 8 row by 10 column image-guides. As further example, a canvas with an aspect ratio of 0.75, such as a 15 inch by 20 inch canvas, may be accommodated with the 8 row by 10 column image-guides by utilizing a sub-array of 7 rows by 10 columns and additionally including one-half of a row, so that the masked image-guide involves 7.5 rows by 10 columns generating a composition frame of aspect ratio of 0.75, matching the aspect ratio of the desired canvas for the composition. Thus the composition frame modified by the masking of the image-guide will frame a shape on the image substantially identical to the shape of the canvas.

Figure 9:
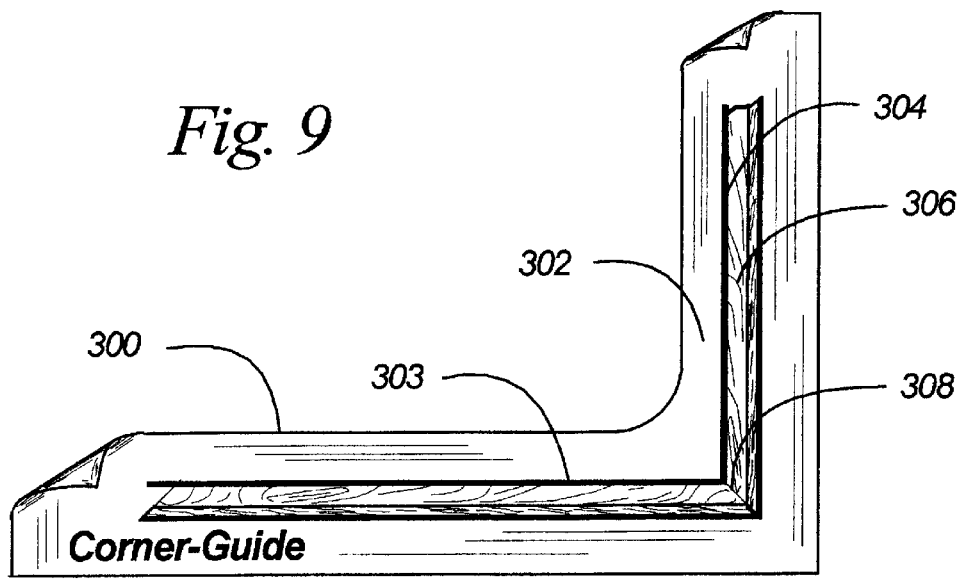
FIG. 9 illustrates a corner-guide for adjusting the frames of image-guides wherein the frames represent wooden picture frames.
Figure 10:
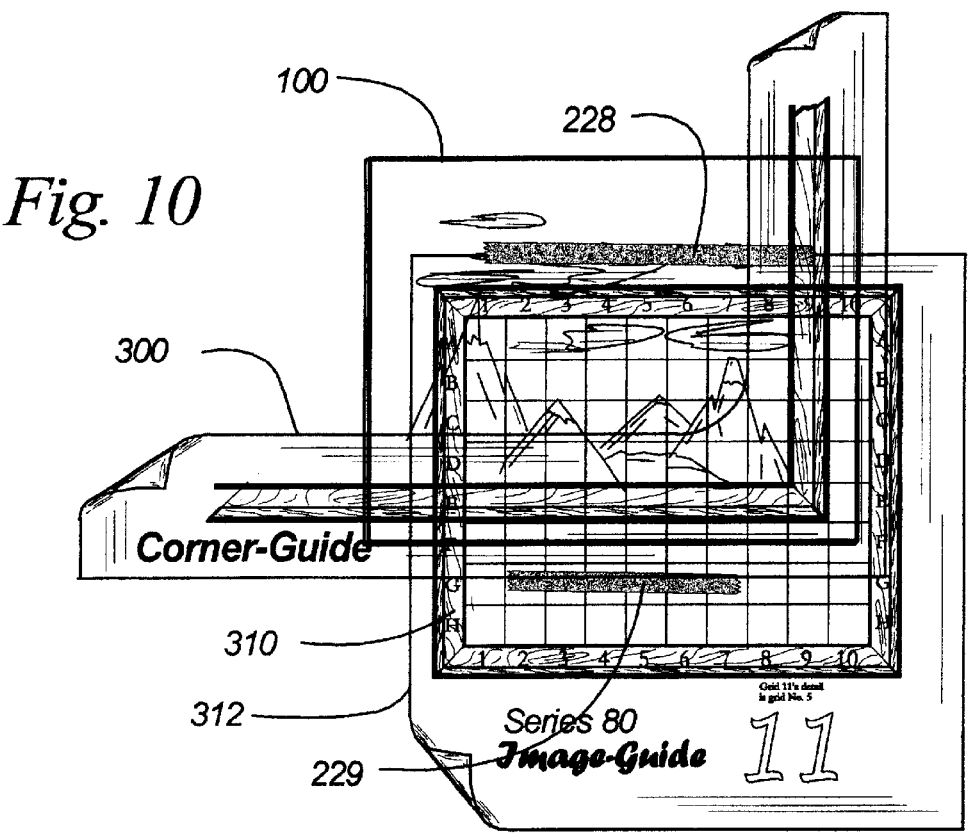
FIG. 10 illustrates a corner-guide used with an image and image-guide, with a wooden picture frame representation, for a canvas of 0.50 aspect ratio.

FIG. 9 illustrates a comer-guide 300 constructed, according to the method for constructing image-guides, on clear acetate sheet material 302 for aligning with row and column positions on images that have aspect ratios other than 0.80. A row alignment line 303 and a column alignment line 304 intersect at a 90-degree corner to be oriented over an image-guide and positioned at predetermined row and column locations to generate a modified image-guide of differing aspect ratio. A section of a picture frame 306 with mitered corner 308 helps in visualization of the final composition. FIG. 10 illustrates the use of a 0.50 aspect ratio image region for a 0.50 aspect ratio canvas such as a 12 by 24 inch canvas. TABLE II-c to be described below is used to identify the row and column alignments for comer-guide 300 for 0.50 aspect ratio canvas shapes. The comer-guide is secured to Image-guide 11 312 with tape 229, and the image composition is adjusted horizontally and vertically over picture 100. This preferred embodiment of the image-guide also includes a representation of a picture frame 310 to aid in composing the image. After the composition is defined, the combined image-guide with comer-guide is secured to picture 100 with tape 228.

Canvas tables may be provided to reference all common canvas sizes and may group all canvases according to aspect ratio. The canvas tables additionally provide a reference to the appropriate scale on a canvas ruler which can be used to simplify marking of the canvas for location of grid lines, typically accomplished with some difficulty using a normal ruler. The scales on the canvas ruler are simplified in order to present only the information pertinent to the specific class of grid dimensions. For example, scale 1 might include black indicators at every ½-inch location, black arrows at every 1.0 inch location, red markers with black arrows at every 2.0 inch location, and blue markers with red markers and with black arrows at every 4.0 inch location. Such a scale is very easy to use for locating each grid line for ½-inch, 1.0 inch, 2.0 inch, and 4.0 inch canvas grid spacings. A larger canvas ruler may include, for example, green markers at every other blue marker and yellow markers at every other green marker forming easy to use guides for 8.0 and 16.0 inch canvas grids as well, for painting wall murals, for example. Yet larger grids may be constructed using 1.0, 2.0, 4.0, and 8.0 feet, for example, for painting large compositions such as highway billboards.

Another significant feature of the invention is to greatly simplify the proper spacing for grid lines being drawn on the canvas. Such grid lines are drawn upon a canvas that has not been pre-gridded and also upon pre-gridded canvases when the artist desires to use a more detailed image-guide as discussed above with reference to FIGS. 7 and 8.

FIG. 11 illustrates a ruler 340 for gridding a canvas. The first side 342 of ruler 340 advantageously includes an instruction statement 341, a scale 1 344 and a scale 3 346. Scale 1 344 includes three types of secondary scale divisions, all power-of-2 multiples of a ½ inch primary division, that is, 1.0 inch, 2.0 inches, and 4.0 inches. Arrow-markers 350 are located 1.0-inch apart for easily marking a canvas for 1-inch canvas grids, and simple line markers 348 are useful for subdividing the 1-inch arrow-markers 350 in half for generating detail grid lines spaced at ½ inch. Single-box markers 352, which may be colored red, for example, are located at 2.0-inch spacings for easily marking a canvas for 2-inch canvas grid lines. Double-box markers 354, which may be colored blue, for example, are located at 4.0-inch spacings for easily marking a canvas for 4-inch canvas grid lines. Scale 1 344 may be used on the top of the face of a canvas, not shown, to mark the canvas for grid lines, for which a pencil may be used, for example. An inverted scale label 345 allows a user to flip the canvas-ruler end-for-end and align along the bottom of the canvas face to mark the canvas for grid lines so that the opposing top marks and the bottom marks may be connected with lines to form canvas grid lines parallel to the left edge of the canvas structure. In like manner horizontal canvas grid lines may be constructed normal to the vertical lines using the same canvas-ruler markers, forming squares.

The type of marker used to make the grid lines will depend, in part, on the painting media used by the artist. Generally, oil paints completely cover the grid lines so that erasure or removal is not necessary. For water colors, however, the grid lines are preferably drawn on the canvas with an easily erased media such as a #2 pencil. A gum eraser is effective for erasing the grid lines after the artist has completed the outline on canvas 200.

Scale 3 346 includes three types of secondary scale divisions, all multiples of a ¾ inch primary division. Simple line markers 360, arrow-markers 362, small-box markers 364, and large-box markers 366 are provided for ¾ inch, 1.5-inch, 3-inch, and 6-inch canvas grid patterns respectively. Any of these scales may be used for generating detail grid patterns for the next-larger grid spacing.

Canvas-ruler 340 may preferably be approximately 1-½ inches wide and 11-½ inches in length and constructed of, for example, heavy paper or cardboard using printing methods well known in the art, and allows use with most common canvas sizes, and may be used in a step and repeat fashion for larger canvas sizes. For larger canvases, a larger canvas ruler of the order of 26 inches long may be utilized. For increased durability the canvas-ruler may be sealed within a clear plastic structure, or laminated, a process well known in the printing business.

FIG. 12 shows the second side 370 of ruler 340 that includes a scale 2 372 and a scale 4 374. Scale 2 372 includes three types of secondary scale divisions, all multiples of a ⅝ inch primary division. Scale 4 374 includes three types of secondary scale divisions, all multiples of a ⅞ inch primary division. Both scales include simple line markers, arrow markers, small-box markers, and large-box markers, useable in similar fashion to those of FIG. 11(a).

Figure 18:
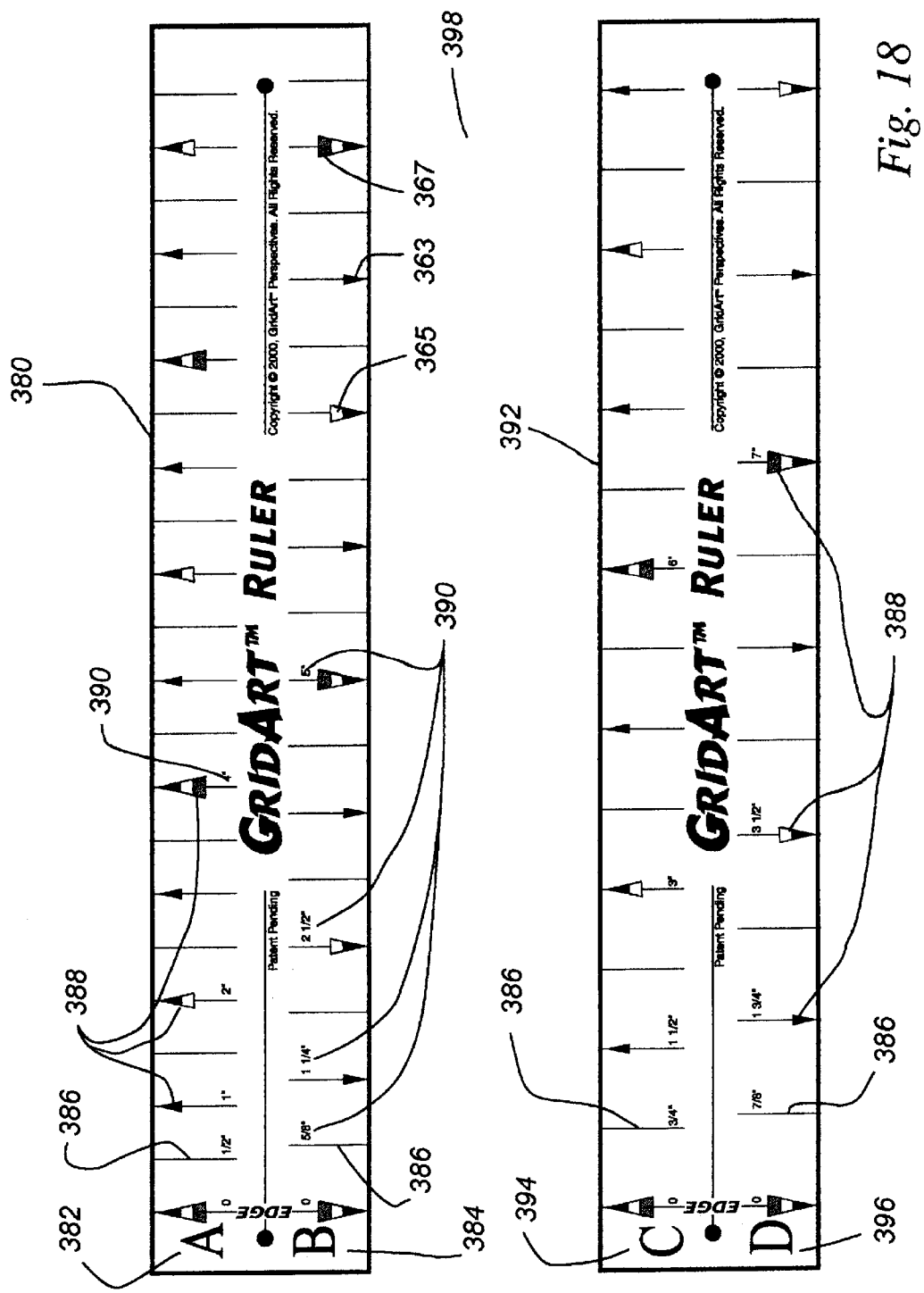
FIG. 18 illustrates both sides of an alternate canvas ruler showing scales A, B, C, and D.

FIG. 18 illustrates a preferred embodiment of a canvas ruler 398 approximately 1-½ inches wide and 11-½ inches long, showing first side 380 with scale A 382 and scale B 384, and second side 392 with scale C 394 and scale D 396. Canvas ruler 398 includes instruction statements ("EDGE"), scale divisions, line markers and arrow symbols that function similar to those of FIG. 11 and FIG. 12 described above. Each scale of canvas ruler 398 includes primary scale markers 386 without arrow heads, and secondary scale markers 388 and also includes marker grid dimensions 390 that identify the grid space dimensions for corresponding canvas grid lines, in inches. Secondary scale markers 388 may include sole arrow tip markers 363 analogous to arrow-markers 362 of FIG. 11, single trapezoidal box markers 365 with arrow tips analogous to the single box markers 364 of FIG. 11 and double trapezoidal box markers 367 with single trapezoidal boxes and with arrow tips analogous to the double box markers 366 of FIG. 11. The single trapezoidal box markers 365 shown white may be advantageously colored red, for example, for clarity, and the larger trapezoidal box of the double trapezoidal box markers 367 shown crosshatch in FIG. 18, may be advantageously colored blue for clarity.

TABLE II illustrates another format of canvas tables provided for users to locate their canvas size and determine the appropriate canvas ruler scale and marker. Also included are grid sizes, and for non 8 by 10 canvas shapes, the enclosed rows or fractions thereof and enclosed columns or fractions thereof for use with corner-guides previously described. Users align and tape the corner-guide over an image-guide according to the table entries for their canvas.

TABLE II

Canvas Tables a. Canvas Shapes with 0.80 Aspect Ratio

| Canvas Size | Ruler Scale | Ruler Marker | Canvas Grid, in. | Canvas Grid, cm. |
|---|---|---|---|---|
| 8 × 10 | 1 | All arrows | 1.0 | 2.54 |
| 10 × 12.5 | 2 | All arrows | 1.25 | 3.18 |
| 12 × 15 | 3 | All arrows | 1.5 | 3.81 |
| 14 × 17.5 | 4 | All arrows | 1.75 | 4.45 |
| 16 × 20 | 1 | All small boxes | 2.0 | 5.08 |
| 20 × 25 | 2 | All small boxes | 2.5 | 6.35 |
| 24 × 30 | 3 | All small boxes | 3.0 | 7.62 |
| 28 × 35 | 4 | All small boxes | 3.5 | 8.89 |
| 32 × 40 | 1 | All large boxes | 4.0 | 10.16 |
| 40 × 50 | 2 | All large boxes | 5.0 | 12.70 |
| 48 × 60 | 3 | All large boxes | 6.0 | 15.24 |
| 56 × 70 | 4 | All large boxes | 7.0 | 17.78 |

Note: All sizes may not be commonly available.

TABLE II-continued

Canvas Tables b. Canvas Shapes with 1.0 Aspect Ratio (square)

| Canvas Size | Ruler Scale | Ruler Marker | Canvas Grid, in. | Corner-guide Last or Fractional* Row | Corner-guide Last or Fractional* Column |
|---|---|---|---|---|---|
| 8 × 8 | 1 | All arrows | 1.0 | H | 8 |
| 10 × 10 | 2 | All arrows | 1.25 | H | 8 |
| 12 × 12 | 3 | All arrows | 1.5 | H | 8 |
| 14 × 14 | 4 | All arrows | 1.75 | H | 8 |
| 15 × 15 | 1 | All small boxes | 2.0 | ½ into H | ½ into 8 |
| 16 × 16 | 1 | All small boxes | 2.0 | H | 8 |
| 20 × 20 | 2 | All small boxes | 2.5 | H | 8 |
| 24 × 24 | 3 | All small boxes | 3.0 | H | 8 |
| 28 × 28 | 4 | All small boxes | 3.5 | H | 8 |
| 30 × 30 | 1 | All large boxes | 4.0 | ½ into H | ½ into 8 |
| 40 × 40 | 2 | All large boxes | 5.0 | H | 8 |
| 48 × 48 | 3 | All large boxes | 6.0 | H | 8 |
| 56 × 56 | 4 | All large boxes | 7.0 | H | 8 | c. Canvas Shapes with 0.5 Aspect Ratio (2:1)

| 6 × 12 | 2 | All arrows | 1.25 | ⁵⁄₁₀ into E | ⁵⁄₁₀ into 10 |
| 8 × 16 | 1 | All small boxes | 2.0 | D | 8 |
| 10 × 20 | 1 | All small boxes | 2.0 | E | 10 |
| 12 × 24 | 3 | All small boxes | 3.0 | D | 8 |
| 15 × 30 | 3 | All small boxes | 3.0 | E | 10 |
| 16 × 32 | 1 | All large boxes | 4.0 | D | 8 |
| 20 × 40 | 1 | All large boxes | 4.0 | E | 10 |
| 24 × 48 | 3 | All large boxes | 6.0 | D | 8 |
| 28 × 56 | 4 | All large boxes | 7.0 | D | 8 |
| 30 × 60 | 3 | All large boxes | 6.0 | E | 10 | d. Canvas Shapes with Other Aspect Ratio (not H-10)

| 9 × 12 | 2 | All arrows | 1.25 | ²⁄₁₀ into H | ⁶⁄₁₀ into 10 |
| 10 × 12 | 2 | All arrows | 1.25 | H | ⁶⁄₁₀ into 10 |
| 10 × 14 | 3 | All arrows | 1.5 | ⅔ into G | ⅓ into 10 |
| 10 × 15 | 3 | All arrows | 1.5 | ⅔ into G | 10 |
| 11 × 14 | 3 | All arrows | 1.5 | ⅓ into H | ⅓ into 10 |
| 12 × 16 | 4 | All arrows | 1.75 | ⁹⁄₁₀ into G | ⅛ into 10 |
| 14 × 18 | 1 | All small boxes | 2.0 | G | 9 |
| 15 × 18 | 1 | All small boxes | 2.0 | ½ into H | 9 |
| 17 × 24 | 2 | All small boxes | 2.5 | ¼ into H | ⅜ into 10 |
| 20 × 24 | 2 | All small boxes | 2.5 | H | ⅝ into 10 |
| 22 × 28 | 3 | All small boxes | 3.0 | ⅓ into H | ⅓ into 10 |
| 20 × 30 | 3 | All small boxes | 3.0 | ⅔ into G | 10 |
| 22 × 30 | 3 | All small boxes | 3.0 | ⅓ into H | 10 |
| 24 × 36 | 4 | All small boxes | 3.5 | ⅞ into G | ⅓ beyond 10 |
| 30 × 40 | 1 | All large boxes | 4.0 | ½ into H | 10 |
| 36 × 48 | 2 | All large boxes | 5.0 | ¼ into H | ⅜ into 10 |
| 48 × 56 | 3 | All large boxes | 6.0 | H | ⅓ into 10 |
| 60 × 72 | 4 | All large boxes | 7.0 | ½ beyond H | ¼ beyond 10 |
| 60 × 72 | 1** | Alternate large boxes | 8.0 | ½ into H | 9 |

*Fractional values rounded to convenient fractions of rows and columns
**Alternative to entry above An alternative method to Table II for determining an appropriate canvas grid spacing is the following algorithm in which Canvas Grid may be in inches or centimeters according to the measurement units used below:

1. Measure the long dimension of the canvas to be used and divide it by 10 to obtain 'calculated canvas grid'.

2. Using 'calculated canvas grid' for 'Canvas Grid', enter table II-a to find the scale and marker.
3. If 'calculated canvas grid' is not found in the table, 'Canvas Grid' becomes the next larger grid size found in the table.
4. If 8.00 X 'Canvas Grid'<canvas short dimension, use the yet next larger grid size in the table for Canvas Grid to find the scale and marker.

Users apply grids and labels to a canvas, and then tape a comer-guide to their image-guide in preparation for drawing.

FIG. 19 illustrates a preferred canvas table 600 which tabulates substantially all common canvas sizes in the English system, showing height and width measurements in inches, such as, for example, 12×15 canvas 602 that measures 12 inches high by 15 inches wide.

All canvases in COLUMN 1 604 have aspect ratios of 0.80 similar to those shown in Table II-a, and share the same aspect ratio of the preferred embodiment image-guides of Table I, therefore not requiring the use of a comer-guide previously described. Other canvas shapes are tabulated in the remaining columns 606 similar to Tables I-b, -c, and -d previously described.

Ruler Information 610 includes Ruler Scale column 612, Marker Description column 614, and Ruler Grid Markers column 616 which identify the specific ruler parameters for use for each canvas along the corresponding row to the left in canvas table 600. Though it is not necessary for the artist to actually be concerned with or know the value of the grid dimension, it is shown on canvas table 600 in the Grid Size column 618 showing marker grid dimensions 390 as previously described for FIG. 18.

Canvas ruler primary markers 386 without arrowheads, previously described in conjunction with FIG. 18, are indicated for use with small canvas sizes and therefore correspondingly small primary grid sizes 608. Somewhat larger canvas sizes, for example 12×15 canvas 602, utilize the indicated secondary grid markers 388 on the indicated Ruler Scale 620 as found in Ruler Information 610 along the row in which the canvas is located within canvas table 600. Thus it is found that 12×15 canvas 602 uses canvas ruler scale C 620 and Marker Description 622 "USE EVERY ARROW THAT HAS BLACK". Ruler Grid Markers 388 on ruler scale C are therefore used to grid 12×15 canvas 602 of the example, which is a 1-½ inch grid 624.

It should be understood that for larger canvases, such as the commonly used 20 inch by 24 inch canvas 626, not every scale marker is to be used, as shown in Ruler Grid Markers 628 in which the sole arrow tip markers 363 of FIG. 18 without single or double trapezoidal boxes is excluded from use for canvases in this size group. In similar fashion, yet larger canvases use only every arrow that has blue, or cross-hatching in FIG. 19.

The generality that image-guides of Table I all contain 80 cells allows an artist to easily establish grid dimensions for general measurement units described in statement 630. Furthermore, canvas or drawing surfaces of any size in any unit of measure may be gridded by using grid calculation method 632 of FIG. 19.

Figure 13:
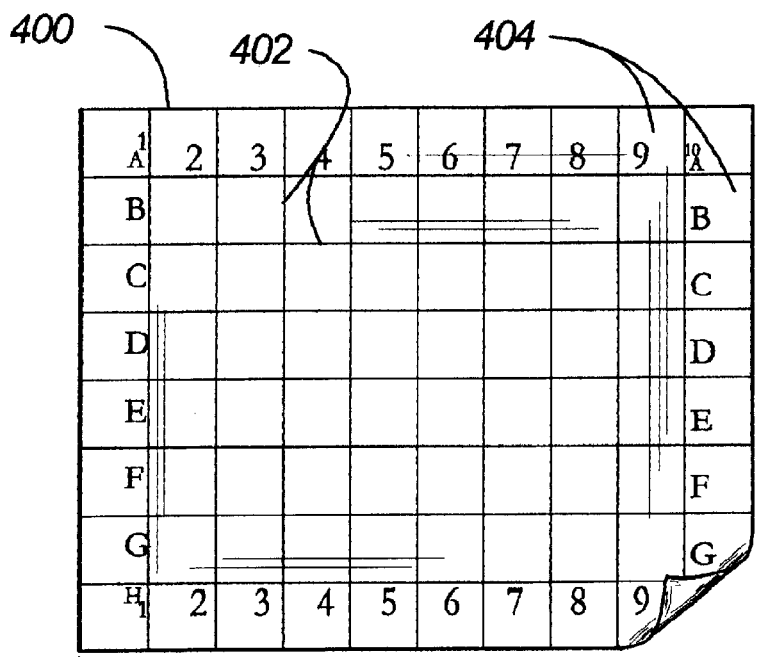
FIG. 13 depicts a back-illuminated canvas grid.

FIG. 13 depicts a grid transparency 400 for gridding a canvas. Member 400 is constructed preferably of polycarbonate, acetate or other clear, flexible material approximately 0.010 inch thick with canvas grid lines 402, row and column labels 404 attached thereto. The method of manufacture may be photographic or silk-screening, for example, onto standard plastic sheet, methods well known in the graphics field. The grid lines may be dark upon clear material, or clear lines within opaque background such that the transparency produces white or lighted lines and labels against dark.

Figure 14:
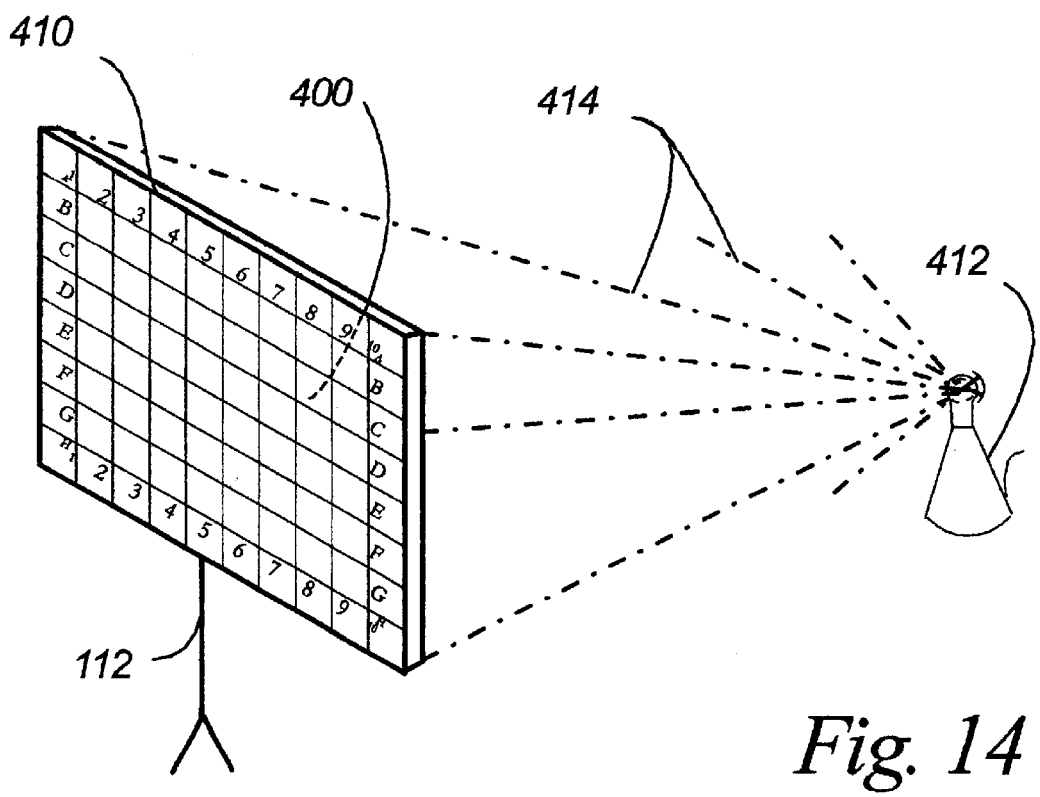
FIG. 14 illustrates the use of a back-illuminated canvas grid.

Canvas grid transparency 400 is placed behind a canvas 410 illustrated in FIG. 14 and captured around the edges between the canvas material and the wooden canvas structure on the backside to temporarily attach transparency 400 to the rear of the canvas 410. Canvas 410 is shown on easel 112 for clarity, and is back-illuminated through grid transparency 400 by illuminator 412 casting light rays 414 so that the grid lines 402 show up in the artist's side of the canvas. Illuminator 412 may be a light bulb or sunlight, for example.

Figure 15:
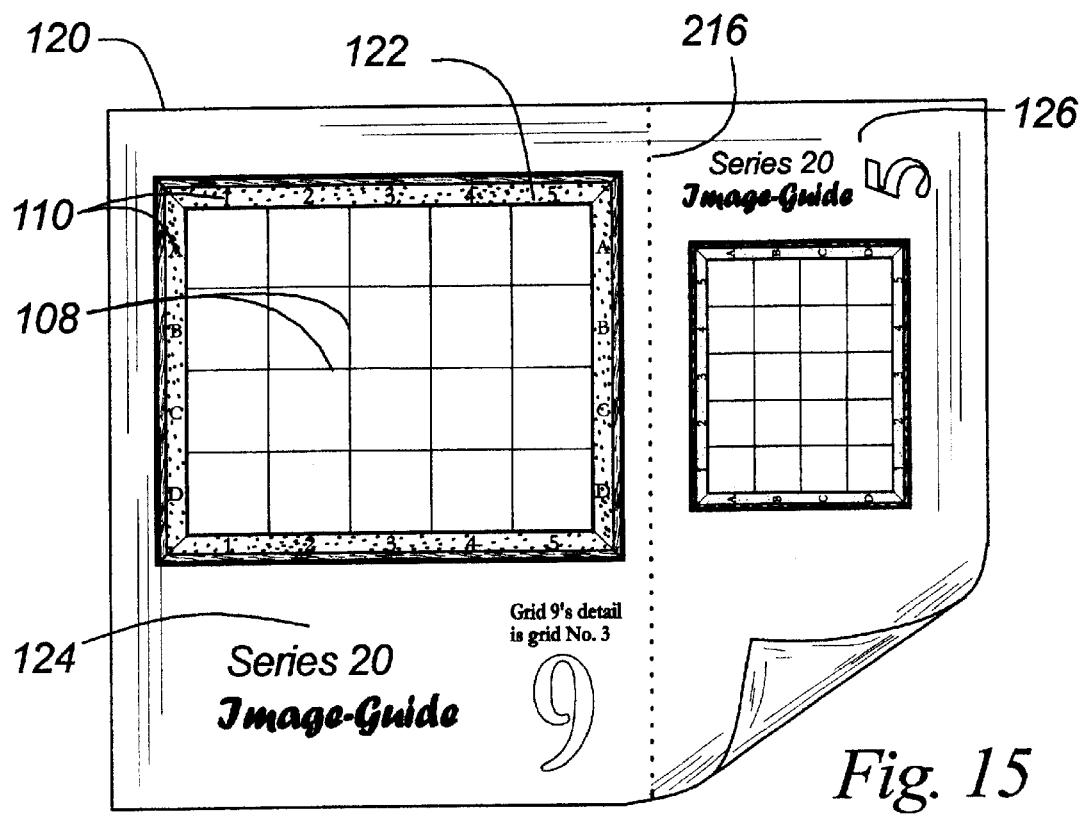
FIG. 15 depicts an acetate sheet with two series 20 image-guides of the present invention.

FIG. 15 illustrates an acetate sheet 120 with two preferred embodiment series 20 image-guides 124 and 126 in which there are 4 rows and 5 columns that form 20 cells, and shown utilizing a simulated wooden picture frame 122 for the composition frame. Cut line 216 previously discussed separates the two image-guides. Row and column labels 110 identify the five columns and four rows of vertical and horizontal grid lines 108.

Figure 16:
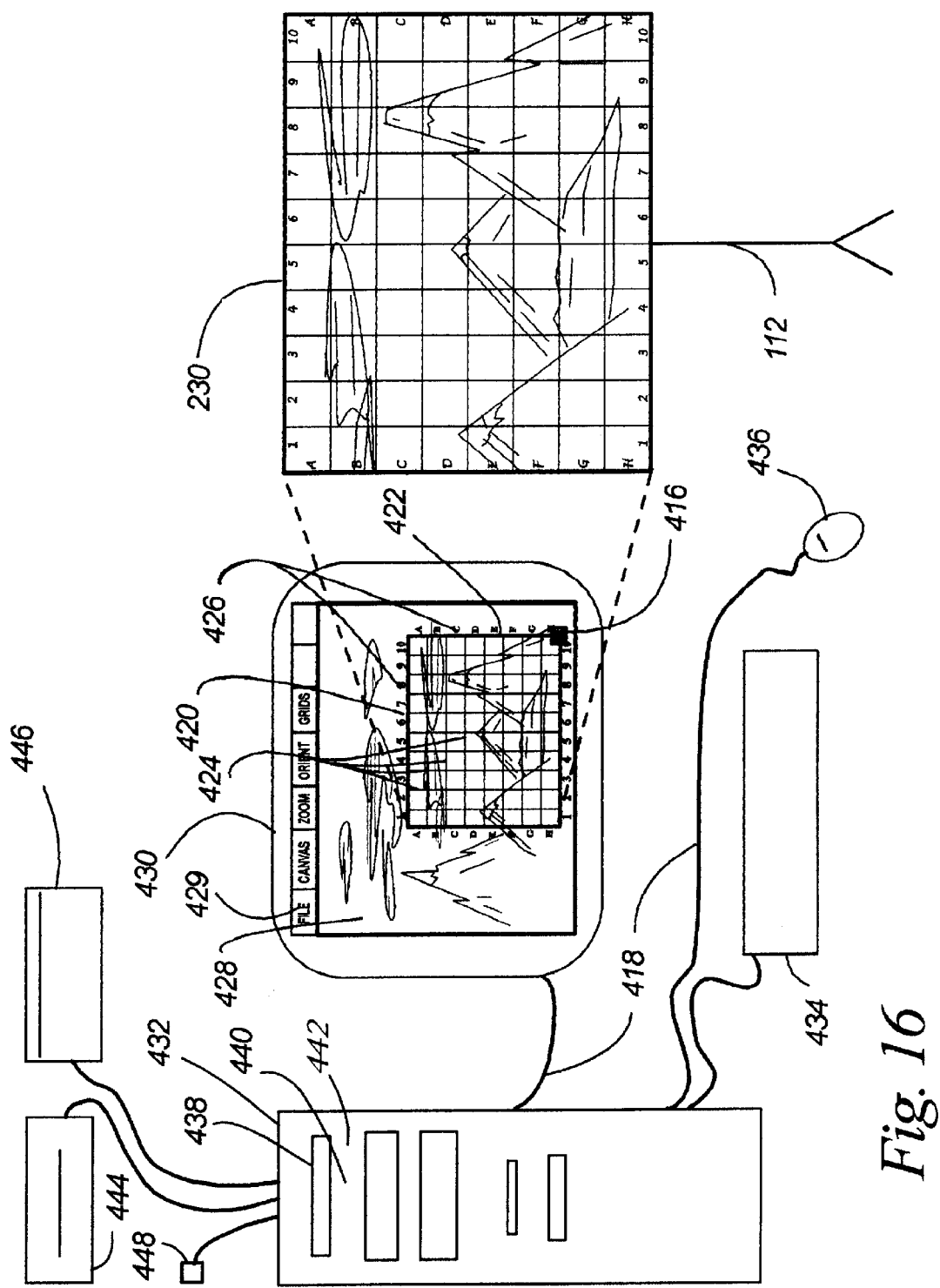
FIG. 16 depicts the use of a software-generated image-guide for drawing a likeness onto a canvas.
Figure 17:
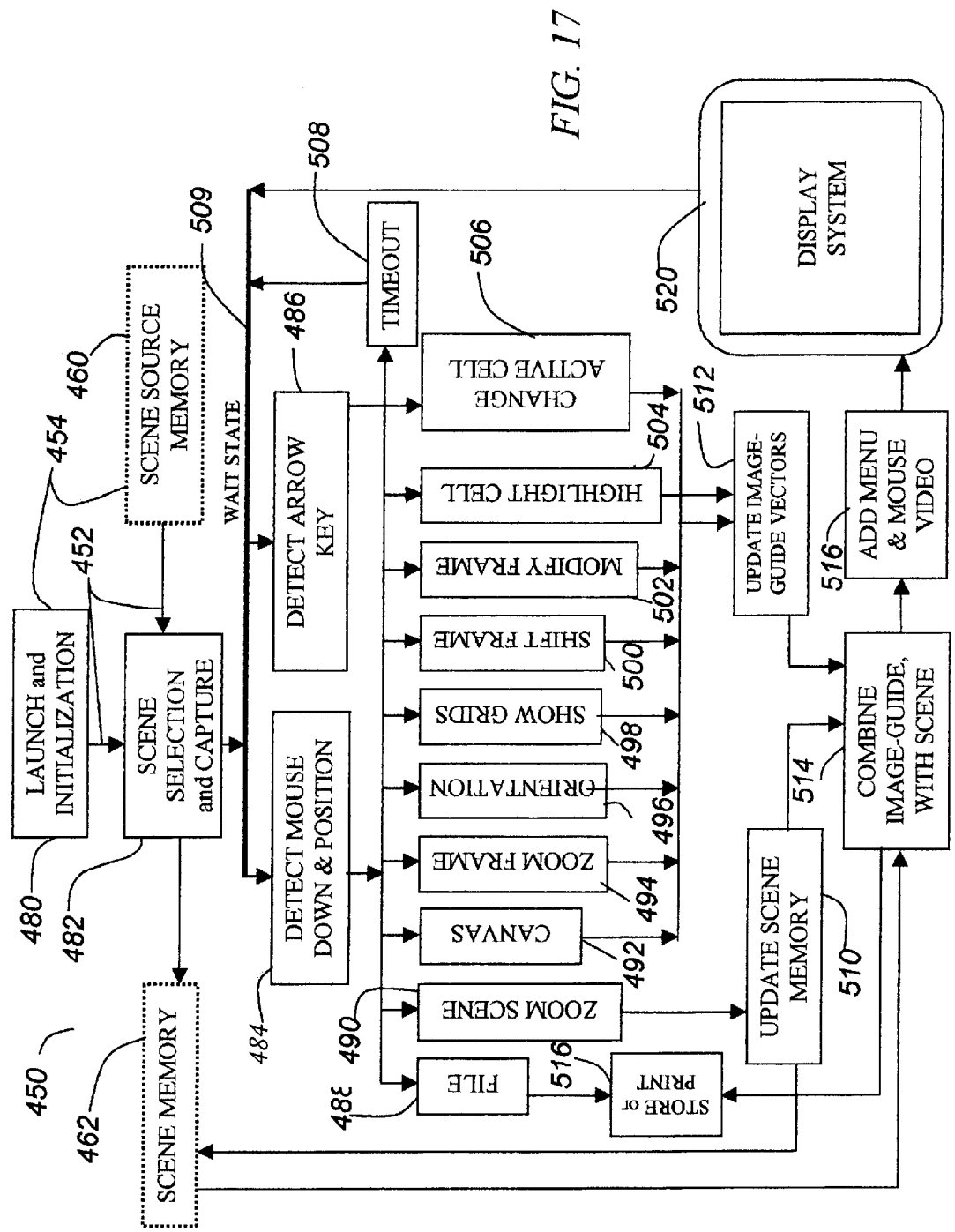
FIG. 17 depicts a software program for generating and displaying images with image-guides of FIG. 16.

Other preferred embodiments of the invention automatically grid the original image with computer-generated image grids. Thus, FIG. 16 depicts another preferred embodiment wherein software-generated image-guide 420 includes frame 422, horizontal and vertical grid lines 424, and row and column labels 426 displayed upon computer monitor 430. A personal computer 432, keyboard 434, mouse 436, and internal computer components 438 including operating system software 440 as well known in the art, are interconnected to display scenes 428 onto computer monitor 430. Included within internal computer components 438 is specialized software 442 of this invention to be described below, along with other elements not illustrated but well known in the art, including random access memory, read only memory, logic, hard disks, a compact disk reader, CDs, a modem, a power supply and other elements not shown. A labeled and gridded canvas 230 as described for FIG. 3 is shown on easel 112 for clarity. In a fashion similar to that described for FIGS. 3 through FIG. 8, an artist creates a likeness upon canvas 230 from an image from scene 428 that is enclosed by frame 422. The combination displayed upon computer monitor 430 may be printed from printer 444 and used in similar fashion to create a likeness of the image onto canvas 230 also within the scope of this invention. Scene 428 may be a scanned picture from scanner 446, a scene from a compact disk or CD, a scene from a digital camera or video camera, or a scene from the internet obtained from internet connection 448, for example.

With the aid of personal computer 432 and specialized software 442 substantially any magnification may be created, landscape or portrait orientations of the software-generated image-guide 420 may be generated. Modes of display may be provided wherein only the frame is displayed, which may also be a likeness of a picture-frame. Some regions outside of the composition frame may be dimmed or obscured to emphasize the composition region.

Canvas Tables in memory may be utilized in the specialized software 442 so that an artist may choose her canvas size, and frame 422 thereupon adjusts to include the appropriate rows and columns, and any required fractions thereof to serve the function of the corner-guide of FIG. 9 and FIG. 10. Zoom capabilities may be included to allow a user to enlarge the active cell of the grid pattern on which she is working, and for detail image areas, and 2:1 grid resolutions may be displayed in fashion similar to detail grids previously described. Other detail grid resolutions may be displayed as well. Frame 422 is a software-generated rectangle that represents the destination canvas, and may be modified by selecting either canvas aspect ratio or specific canvas dimensions. The software program then provides canvas grid application instructions to the user, such as canvas-ruler scale and marker. Menu 429 provides a user with a selection of software program actions. A user may modify the composition frame by mouse-selecting frame modifier box 416 and drag to create a new magnification. If a control key is also depressed, the frame modifier may change in aspect ratio as the user "drags", and new canvas choices may be displayed in a text window, not shown.

Specialized software 442 may be generated in common software program languages such as "C", "Visual Basic", and others well known in the field, and easily generated by those skilled in the art from software flow diagram 450 illustrated in FIG. 16, which depicts various functional blocks representing software code functions, hardware elements, and information pathways 452. LAUNCH and INITIALIZATION 480 function includes normal application startup functions well known in the software field. Initialization may include a default software-generated image-guide size and shape, or may default to the previously used size and shape. SCENE SELECTION and CAPTURE 482 requests of the user to load into SCENE MEMORY 462 the desired scene from SCENE SOURCE MEMORY 460, such as a CD, digital camera, video camera, internet connection, scanned scene, digitally drawn scene, and the like.

In WAIT STATE 509 the program awaits for a down-mouse button action in DETECT MOUSE DOWN & POSITION 484, or a DETECT ARROW KEY 486 action. As is typical in personal computer applications, various functions may be activated when the mouse position indicator, not shown, is over a specific region of the computer screen, such as a menu button or the image-guide frame. These are described for the following nine actions:

1. FILE 488 directs the program flow to store the current file to chosen memory not shown, or to print the computer screen from a sub-menu not shown, as is common in personal computer applications, illustrated in function STORE or PRINT 516 which stores or prints the combined scene and image-guide from the function COMBINE IMAGE-GUIDE WITH SCENE 514.

2. ZOOM SCENE 490 directs the program to expand or compress the scene uniformly in horizontal and vertical dimensions for flexibility in use, followed by a scene update in UPDATE SCENE MEMORY 510.

The following actions 3 through 9, after performing their functions, direct the program to update the software-generated image-guide in UPDATE IMAGE-GUIDE VECTORS 512.

3. CANVAS 492 directs the program to define the selected canvas size or aspect ratio from a sub-menu not shown containing the canvas and ruler information of Table II.

4. ZOOM FRAME 494 directs the program to expand or compress the software-generated image-guide in small steps, such as 2% steps or substantially continuous adjustment, to allow the user to adjust magnification from the scene to the canvas, as the user composes her image from the scene.

5. ORIENTATION 496 function rotates the software-generated image-guide for either landscape or portrait use.

6. SHOW GRIDS 498 toggles the grids within the image-guide frame on and off. Users may prefer composing their image in magnification and in translation with the grids and labels turned off, using the frame alone.

7. SHIFT FRAME 500 allows the user to position the mouse indicator over the frame and then, with the mouse-button held down, translate the frame horizontally and/or vertically to compose the image.

8. MODIFY FRAME 502 allows the user to position the mouse indicator over the composition frame modifier box and then, with the mouse-button held down, enlarge or shrink the composition frame to compose the image. If the control key, not shown, is detected, the aspect ratio of the composition frame may be changed as well by removing the constraint that changes in vertical and horizontal frame size remain proportional to the original frame dimensions.

9. HIGHLIGHT CELL 504 outlines the active cell with which the user is working with a bold square, a marquee, a colored square, a flashing outline, or the like to help user to keep track of the active cell.

In response to a DETECT ARROW KEY 486 occurrence when a user depresses one of the four keyboard arrow keys, not shown, the program flow is directed to CHANGE ACTIVE CELL 506 which may move the active cell selection in a direction according to the particular arrow key, as is commonly provided in personal computer applications.

Program flow from UPDATE SCENE MEMORY 510 or UPDATE IMAGE-GUIDE VECTORS 512 continues to the function COMBINE IMAGE-GUIDE WITH SCENE 514 wherein the image-guide is electronically overlayed onto the scene, and is then fed to ADD MENU & MOUSE VIDEO 516 wherein the video information for DISPLAY SYSTEM 520 is combined. Following the updating of video information, the program flow returns to WAIT STATE 509. TIMEOUT 508 may be triggered following 30 seconds, for example, of mouse-down condition, returning the program to WAIT STATE 509.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A drawing system for facilitating a creation of a drawing onto a canvas, said drawing derived from an image, comprising:

a set of image guides having grid patterns;

a first guide of said set of image guides being dimensionally related to a second guide of said set of image guides, said second guide having a grid special proportionately smaller said first guide so that said second guide can be overlaid said first guide to provide a detailed image guide member for a portion of said image; and means for gridding said canvas, including a gridding based upon a grid special provided by said detailed image guide member.

2. The drawing system of claim 1, further comprising composition frames enclosing each of said grid patterns on each of the image guides of said set.

3. The drawing system of claim 1, wherein said means for gridding said canvas is a canvas ruler having a plurality of scales related to a length and width of said canvas.

4. The drawing system of claim 3, wherein said second guide having a grid special proportionately smaller said first guide has a grid special one-half said first guide.

5. A drawing system for a creation of a drawing onto a destination base, said drawing derived from an image, comprising:

a plurality of image guides adapted to overlay said image;

a grid pattern on each of said image guides having rows and columns forming squares;

said grid patterns varying in size by predetermined percentages, wherein said variation in size by predetermined percentages facilitates an adjustment in size of a desirable portion of said image into said drawing; and overlayable detail image-guides for creating a drawing of fine detail wherein said detail image-guides are adapted to overlay said image guides, wherein said detail image guides divide a portion of said squares into a plurality of sub-squares.

6. A drawing system for creating a drawing onto a destination base, said drawing derived from an image, comprising:

a plurality of substantially transparent image guides adapted to overlay said image;

a grid pattern on each of said guides having row and column labels, said grid patterns increasing in size by a predetermined percentage from one image guide to the next; and means for modifying a composition frame in order to match the shape of a chosen canvas.

7. The drawing system of claim 6, wherein said means for modifying a composition frame comprises a corner guide.

8. A drawing system for creating a drawing onto a destination base, said drawing derived from an image, comprising:

a plurality of substantially transparent image guides adapted to overlay said image;

a grid pattern on each of said guides having row and column labels, said grid patterns increasing in size by a predetermined percentage from one image guide to the next;

means for modifying a composition frame in order to match the shape of a chosen canvas; and a canvas table specifying canvas ruler scales for various canvas sizes, and specified positions for said means for modifying a composition frame for various canvas shapes.

9. The drawing system of claim 8, wherein said means for modifying a composition frame comprises a corner guide.

10. A drawing system for a creation of a drawing onto a destination base, said drawing derived from an image, comprising:

a plurality of image guides adapted to overlay said image;

a grid pattern on each of said image guides having rows and columns forming squares;

said grid patterns varying in size by predetermined percentages, wherein said variation in size by predetermined percentages facilitates an adjustment in size of a desirable portion of said image into said drawing; and pre-printed grids and labels on clear plastic sheets for placing on the backside of canvases an illuminating from the back.

11. A drawing system for creating a drawing onto a destination base, said drawing derived from an image, comprising:

a plurality of substantially transparent image guides adapted to overlay said image; and a grid pattern on each of said guides having row and column labels, said grid patterns increasing in size by a predetermined percentage from one image guide to the next, wherein a composition frame encloses each of said grid patterns, wherein said composition frames are simulated picture frames.

12. A method for drawing a likeness of an image onto a destination base comprising:

overlaying a first image-guide onto said image, wherein said first-image guide comprises a grid pattern of a first spacing;

gridding said destination base, wherein said gridding comprises a grid pattern of a second spacing different than said first spacing wherein gridding said destination base comprises:

applying a transparent grid pattern to the backside of said destination base and providing illumination from the back; and transferring scene information from said image onto the destination base.

13. A drawing system for facilitating a creation of a drawing onto a destination base, said drawing derived from an image, comprising:

a set of image guides having grid patterns of squares of rows and columns;

a first guide of said set of image guides being dimensionally related to a second guide of said set of image guides, said second guide having a grid spacial proportionately smaller said first guide so that said second guide can be overlaid said first guide to provide a detailed image guide member for a portion of said image.

14. A method for drawing a likeness of an image onto a destination base comprising:

overlaying a first image-guide onto said image, wherein said first-image guide comprises a grid pattern of a first spacing;

overlaying a detail image-guide onto said first image guide, wherein said detail image-guide divides a portion of said grid pattern of a first spacing into a plurality of sub-squares;

gridding said destination base, wherein said gridding comprises a grid pattern of a second spacing different than said first spacing; and transferring scene information from said image onto the destination base.

15. A drawing system for a creation of a drawing onto a destination base, said drawing derived from an image stored in a computer, comprising:

a software-generated image guide having a grid pattern comprising rows and columns forming squares, said grid pattern adjustable in size thereby facilitating an adjustment in size of a desirable portion of said image into said drawing;

combining means for overlaying said image guide onto said image to form a gridded image; and a software-generated detail image guide overlayable said image and registered to said image guide wherein said detail image guide divides some of said squares of said grid pattern into a plurality of sub-squares for creating a drawing of fine detail.

16. A method for drawing a likeness of an image onto a destination base, wherein said image is stored in a computer, comprising:

overlaying a software generated image guide onto said image, wherein said image guide comprises a grid pattern of a first spacing, wherein said grid pattern is adjustable in size and location over said image;

overlaying a software-generated detail image guide onto said image wherein said detail image guide subdivides a portion of said image guide grid pattern into a sub-grid pattern;

gridding said destination base, wherein said gridding comprises a grid pattern of a second spacing different than said first spacing; and transferring scene information from said image onto the destination base.

* * * * *

UNITED STATES PATENT AND TRADEMARK OFFICE
CERTIFICATE OF CORRECTION

PATENT NO.    : 6,568,938 B1
DATED         : May 27, 2003
INVENTOR(S)   : Paul R. Prince et al.

It is certified that error appears in the above-identified patent and that said Letters Patent is hereby corrected as shown below:

<u>Column 16,</u>
Lines 51 and 57, change "special" to -- spacial --.
Lines 66-67, change "special" to -- spacial --.

Signed and Sealed this

Eighth Day of June, 2004

JON W. DUDAS
*Acting Director of the United States Patent and Trademark Office*